Feb. 15, 1944.   F. M. CLARK   2,341,761
DIELECTRIC AND INSULATING COMPOSITION
Filed Feb. 25, 1942

Inventor:
Frank M. Clark,
by Harry E. Dunham
His Attorney.

Patented Feb. 15, 1944

2,341,761

UNITED STATES PATENT OFFICE 2,341,761

DIELECTRIC AND INSULATING COMPOSITION

Frank M. Clark, Pittsfield, Mass., assignor to General Electric Company, a corporation of New York Application February 25, 1942, Serial No. 432,272

8 Claims. (Cl. 252—63.7)

The present invention comprises compositions of halogenated diphenyl benzene and halogenated nitrodiphenyl and also capacitors containing such compositions. These compositions have a combination of physical and chemical properties adapting them for the dielectric and insulation fields, and particularly as impregnants for electric capacitors.

Figure 1:
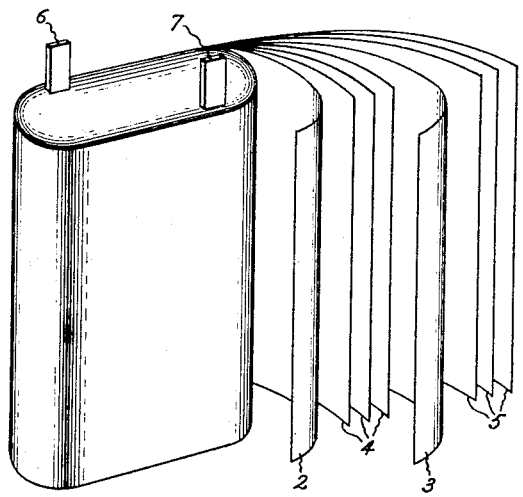
Figure 2:
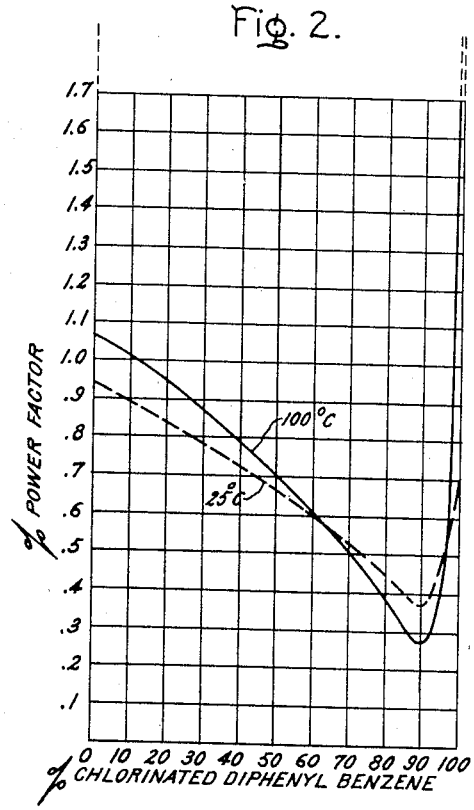

In the accompanying drawing, Fig. 1 is a somewhat conventionalized representation of an electric capacitor; Fig. 2 is a graph showing power factor characteristics of a range of compositions embodying my invention.

In United States Patent 2,041,594 are disclosed various halogenated dielectric compositions, included among which is halogenated diphenyl benzene. This material has advantageous properties, for example chemical stability and non-inflammability, when the halogen content is sufficiently great. Capacitors impregnated with such chlorinated diphenyl benzenes, however, have a lesser capacity and shorter useful life than otherwise similar capacitors which contain correspondingly chlorinated diphenyl or chlorinated diphenyl oxide. The power factor of such solid chlorinated diphenyl benzene when tested at commercial frequencies is higher than that of correspondingly chlorinated diphenyl compounds.

In the past, capacitors have been operated to a large extent at ambient temperatures of approximately 25 to 50° C. In recent years it has been found desirable in many instances to operate capacitors under ambient temperature conditions as high as about 80 to 100° C., and even higher. The high ambient temperature encountered in operations has been due to a large extent to the requirement that capacitors and functionally related electrical apparatus shall be mounted together in the smallest possible space. The heat from adjacent electrical apparatus has resulted in a high ambient temperature. Fluorescent lamp ballast equipment with which capacitors are mounted in a common housing, or electric motors on which capacitors are mounted, are examples of associated electric apparatus which imposes high ambient temperatures on capacitors.

Many materials which have appeared at first examination to be promising of marked superiority as dielectric media by reason of a high dielectric constant have been unsuited for such use by reason of high and sometimes unstable power factors, especially so at elevated temperatures. Halogenated diphenyl benzene, particularly when containing relatively high percentages of halogen, exhibits a relatively high power factor. Over most of the range of halogenation the halogenated diphenyl benzene compounds are high-melting solids. As they are highly viscous when melted, they are introduced with difficulty as impregnants. Capacitors containing solid halogenated diphenyl benzene products which liquefied in the range of ambient temperatures to which capacitors are subjected proved to be particularly unstable due to the sudden change of characteristics which is encountered when a solid dielectric becomes liquefied.

Many compositions consisting of mixtures or blends of apparently compatible dielectric materials in the past have proved to be unsuited for utilization as capacitor impregnants. An example of such undesirable blends is a composition of nitrobenzene and chlorinated diphenyl.

I have discovered, contrary to this previous experience, that the dielectric properties of compositions comprising mixtures of halogenated diphenyl benzene and halogenated nitrodiphenyl are markedly better than the dielectric properties of either ingredient by itself. It is especially advantageous that both at room temperature and at the elevated temperature range to which capacitors commonly are subjected such blends are characterized by low power factor characteristics, or, in other words, by small energy losses.

Halogenated diphenyl benzene and halogenated ortho nitrodiphenyl are compatible with one another, they are mutually soluble and are stable in each other's presence. They form compositions which are less brittle at 25° C. than halogenated diphenyl benzene. They have high dielectric constants as well as low power factors. It is particularly advantageous that capacitors impregnated with compositions containing chlorinated diphenyl benzene and chlorinated ortho nitrodiphenyl have not only a very low power factor, but also a power factor which is substantially constant with time over the operating range of capacitors, which in general extends from 25 to 100° C.

The most advantageous results of my invention are obtained with compositions comprising from a few per cent upward to about 60 per cent tetrachlor ortho nitrodiphenyl, the remainder being chlorinated diphenyl benzene. A preferred composition comprises by weight about 99 to 60 parts of a solid form of chlorinated diphenyl benzene (60 per cent chlorine) and about 1 to 40 parts of a tetrachlor orthonitro diphenyl. Compounds made by chlorinating orthonitro diphenyl are described and claimed in my application Serial No. 322,599, filed March 6, 1940. Chlorinated ortho nitrodiphenyl compounds are described in South African Patent No. 360/41, granted December 5, 1941, and in British Patent No. 548,144, issued December 17, 1942.

The capacitor shown in Fig. 1 in which compositions embodying the present invention may be used is of a type which is in commercial use. It consists of armatures 2, 3 and interposed spacer groups 4, 5 consisting of sheets of suitable dielectric material. Aluminum foil ordinarily is employed for use as armature material, but foil consisting of other metal, such as copper, tin or lead, likewise may be used. The spacers ordinarily consist of kraft paper having a thickness of about .0004 inch. An example of such paper is described in Allen Patent 1,850,702, patented March 22, 1932. Electric connections are made by conductive strips 6, 7 which contact electrically with the respective armatures 2, 3.

The graph constituting Fig. 2 illustrates the power factors of compositions consisting of various blends of tetrachlor ortho nitrodiphenyl and chlorinated diphenyl benzene (60 per cent chlorine). The dashed curve shows the per cent power factor at 25° C., and full line curve shows the per cent power factor obtained with a range of such mixtures at a temperature of 100° C. The latter curve is the most significant, for, as stated above, the operating temperatures of capacitors ordinarily approximate 80 to 100° C. and may be higher.

It will be observed that at 100° C. the power factor of tetrachlor ortho nitrodiphenyl (unassociated with chlorinated diphenyl benzene) is about 1.08 per cent. The power factor of the chlorinated diphenyl benzene (unassociated with the tetrachlor ortho nitrodiphenyl) is also high, being 11 per cent at 100° C. Even very small additions of chlorinated ortho nitrodiphenyl markedly reduce the power factor. A surprisingly low power factor value is obtained when a blend of these two ingredients comprises about 90 per cent of chlorinated diphenyl benzene and about 10 per cent consists of tetrachlor ortho nitrodiphenyl. It is about .37 per cent at 25° C. and decreases to about .28 per cent at 100° C. This decrease in power factor between 25° C. and 100° C. is unexpected and highly favorable for dielectric operation at high temperatures. Greater proportions of chlorinated nitrodiphenyl result in an increase of power factor, as is evident from the graph. As shown in Fig. 2, the addition of only small amounts of the tetrachlor ortho nitrodiphenyl reverses the expected relation of power factor and temperature. For either material alone, the power factor increases as the temperature is increased from 25° to 100° C. With the addition of ortho nitro tetrachlor diphenyl in amounts ranging between 1 per cent and about 35 per cent of the total blend, an increase in temperature from 25° to 100° C. results in a decrease in power factor.

A capacitor which was constructed as shown and described, and which was impregnated with chlorinated diphenyl, will be referred to hereinafter as a comparison unit. At 100° C. such a comparison unit had a capacity of 2.8 microfarads and a power factor of about .5 per cent. The dielectric constant of pentachlor diphenyl having a chlorine content of about 54 per cent (pentachlor diphenyl) is about 5 at 25° C.

A comparison capacitor unit impregnated with chlorinated diphenyl benzene (60 per cent chlorine) has at 100° C. a power factor of .84 per cent. A similar capacitor impregnated with tetrachlor ortho nitrodiphenyl has at 100° C. a power factor of about 1.0 per cent. When impregnated with a blend comprising 90 per cent chlorinated diphenyl benzene (60 per cent chlorine) and 10 per cent of tetrachlor ortho nitrodiphenyl, such a comparison unit has at 100° C. a power factor of .28 per cent. A comparison unit in which the impregnant comprised 75 per cent by weight of chlorinated diphenyl benzene and 25 per cent of tetrachlor ortho nitrodiphenyl showed practically the same characteristics. When operated in a life test for six months at 660 volts alternating current at 75° C., the power factor had decreased from .34 per cent to .32 per cent. The capacity of such a comparison unit at 100° C. when impregnated with the 90:10 composition is 2.6 microfarads and when impregnated with the 75:25 composition is 3.6 microfarads.

Although I have illustrated my invention with reference to chlorinated diphenyl benzene containing 60 per cent chlorine, I do not wish to be limited to this particular compound. Solid chlorinated diphenyl benzene compounds of lower and higher chlorine content behave similarly. Other solid chlorinated polyphenyl compounds are of utility in such compositions. For example, chlorinated diphenyl which contains 65 per cent or more chlorine and as normally obtained are crystalline or brittle resins at room temperature, greatly resembling the chlorinated chlor diphenyl benzene (60 per cent chlorine content). Compositions containing solid chlorinated diphenyl as well as chlorinated diphenyl benzenes are of utility, thus making it unnecessary to separate these products in their commercial manufacture.

In like manner, other chlorinated nitro polyphenyl compounds may be substituted for the ortho nitro tetrachlor diphenyl taken as examples. Such compounds, for example, are the chlorine derivatives of nitro diphenyl ether, nitro diphenylene oxide, nitro diphenyl benzene and nitro diphenyl ketone.

The extent of chlorination of the nitro polyphenyl compound may be varied to meet the exigencies of the electrical application. For service on alternating current voltage circuits, the compounds containing about 4 chlorine atoms per molecule have been found to be best suited. For direct current circuits it is frequently advisable to use a lesser degree of chlorination as, for instance, the di- or trichlor nitro derivatives.

Various organic compounds may be added as, for example, tetrachlor benzene, and in particular the 1,2,4,5 isomer. Other material which may be added to compositions embodying my invention is chlorinated naphthalene, e. g., the tetrachlor naphthalene, and highly chlorinated compounds of diphenyl, diphenyl oxide and diphenylene oxide.

To secure a desired physical condition it is frequently desirable to add other ingredients than those mentioned. For example, additions of inert materials such as silica, wood flour, and the like may be included, particularly when the compositions of the present invention are to be used in potheads, bushings or similar apparatus.

Although I have set forth the advantages of compositions embodying the present invention with particular reference to the capacitor field, they are capable of use generally in the insulating field.

My copending application Serial No. 355,588, filed September 6, 1940, and assigned to the same assignee as the present application, describes and claims compositions including chlorinated diphenyl and chlorinated mono-ortho nitrodiphenyl derived by the chlorination of mono-ortho-nitrodiphenyl, the latter class of compounds herein being termed chlorinated ortho nitrodiphenyl.

What I claim as new and desire to secure by Letters Patent of the United States, is:

1. Compositions of matter suitable for dielectric and insulating purposes comprising as ingredients about 60 to 99 parts of halogenated diphenyl benzene and about 40 to 1 part of halogenated ortho nitrodiphenyl.

2. Compositions of matter suitable for dielectric and insulating purposes comprising as ingredients about 60 to 99 parts of chlorinated diphenyl benzene containing 60 to 65 per cent chlorine and 40 to 1 part of tetrachlor ortho nitrodiphenyl.

3. Compositions of matter suitable for dielectric and insulating purposes comprising as essential and substantial ingredients about 60 to 99 per cent of chlorinated diphenyl benzene and about 40 to 1 per cent of chlorinated ortho nitrodiphenyl.

4. Compositions of matter suitable for dielectric and insulating purposes comprising as essential and substantial ingredients about 90 per cent chlorinated diphenyl benzene and about 10 per cent tetrachlor ortho nitrodiphenyl.

5. A composition of matter comprising as essential and substantial ingredients about 60 to 99 parts of chlorinated diphenyl benzene and about 40 to 1 part of chlorinated orthonitro diphenyl having a chlorine content of about two to four atoms per molecule.

6. A composition suitable for insulating and dielectric purposes comprising at least about 60 parts of chlorinated diphenyl benzene, at least about 1 part of chlorinated orthonitro diphenyl and a substantial amount of the 1,2,4,5 isomer of tetrachlor benzene.

7. Compositions which are suitable for dielectric use comprising the combination of about 60 to 99 parts of chlorinated diphenyl benzene, about 40 parts to 1 part of chlorinated ortho nitrodiphenyl and a substantial amount of the 1,2,4,5 isomer of tetrachlor benzene.

8. Compositions of matter which are suitable for dielectric and insulating purposes comprising as ingredients by weight about 99 parts of chlorinated diphenyl benzene and about 1 part of chlorinated ortho nitrodiphenyl.

FRANK M. CLARK.